(12) United States Patent
Basile et al.

(10) Patent No.: US 10,228,051 B2
(45) Date of Patent: Mar. 12, 2019

(54) TWO-PIECE MOLDED PULLEY HAVING RADIAL BEARING DISTORTION-REDUCING CHARACTERISTICS

(71) Applicant: Ford Global Technologies, LLC, Dearborn, MI (US)

(72) Inventors: James M. Basile, Dundee, MI (US); Scott Willis, Gibraltar, MI (US); Joseph Alan Skrobowski, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/216,837

(22) Filed: Jul. 22, 2016

(65) Prior Publication Data
US 2018/0023679 A1    Jan. 25, 2018

(51) Int. Cl.
| | | |
|---|---|---|
| *F16H 55/36* | (2006.01) | |
| *F16C 19/06* | (2006.01) | |
| *F16C 35/067* | (2006.01) | |
| *F16H 55/56* | (2006.01) | |
| *F16C 33/58* | (2006.01) | |

(52) U.S. Cl.
CPC ............ *F16H 55/36* (2013.01); *F16C 19/06* (2013.01); *F16C 33/586* (2013.01); *F16C 35/067* (2013.01); *F16H 55/566* (2013.01); *F16C 2361/00* (2013.01); *F16C 2361/63* (2013.01)

(58) Field of Classification Search
CPC .... F16C 13/006; F16C 2361/63; F16C 19/06; F16H 2007/0865; F16H 55/36

USPC .......................................................... 474/199
See application file for complete search history.

(56) References Cited

U.S. PATENT DOCUMENTS

| | | | | |
|---|---|---|---|---|
| 499,611 | A * | 6/1893 | Torrey | F16H 55/50 474/177 |
| 859,099 | A * | 7/1907 | Nice, Jr. | 301/5.7 |
| 1,177,046 | A * | 3/1916 | Nice | F16C 13/006 16/46 |
| 1,212,503 | A * | 1/1917 | Klahn | F16C 13/02 384/546 |
| 1,482,579 | A * | 2/1924 | Nice | F16C 13/006 16/46 |

(Continued)

FOREIGN PATENT DOCUMENTS

CN          203685981         7/2014

*Primary Examiner* — Henry Y Liu
(74) *Attorney, Agent, or Firm* — LeClairRyan

(57) ABSTRACT

A two piece pulley is provided in which the pulley main housing and the outer pulley shell are molded without the bearing in place, thus eliminating an over-molding process. The pulley main housing is molded with a bear slip fit pocket. At least one of the bearing races of the bearing assembly includes an axially-protruding raised surface such as knurls or bumps. Each of the pulley main housing and the outer shell includes a bearing shield. On assembly, the bearing is slipped into the pocket on the pulley main housing and the outer shell is then ultrasonically welded to the main housing, thereby compressing the pulley material axially into the raised surface of the bearing race, locking the outer race of the bearing to the pulley in an axial direction. The raised surface on the bearing race allows the bearing assembly to grip the pulley in an axial direction.

11 Claims, 6 Drawing Sheets

(56) References Cited

U.S. PATENT DOCUMENTS

| | | | | |
|---|---|---|---|---|
| 1,627,558 A * | 5/1927 | Grunwald | F16C 13/006 29/463 |
| 1,679,691 A * | 8/1928 | Smith | F16H 55/36 180/53.1 |
| 1,845,631 A * | 2/1932 | Seelbach | E05D 13/00 16/211 |
| 1,848,144 A * | 3/1932 | Pribil | B60L 5/06 16/46 |
| 1,976,019 A * | 10/1934 | Heim | F16C 33/64 29/463 |
| 1,990,805 A * | 2/1935 | Watson | B65G 39/02 193/37 |
| 2,137,987 A * | 11/1938 | Smith | F16H 7/18 301/5.7 |
| 2,315,357 A * | 3/1943 | Smith | F16H 7/18 105/150 |
| 2,349,281 A * | 5/1944 | Kendall | F16H 7/20 29/898.057 |
| 2,631,474 A * | 3/1953 | Skovera | F16H 37/00 384/547 |
| 2,655,813 A * | 10/1953 | Howell | F16H 55/36 29/892.11 |
| 2,655,814 A * | 10/1953 | Holm | F16H 7/18 474/167 |
| 2,669,878 A * | 2/1954 | Nelson | F16H 55/44 474/181 |
| 2,938,757 A * | 5/1960 | Pieper | F16B 39/28 254/390 |
| 3,313,168 A * | 4/1967 | Matthews | B65G 39/02 198/842 |
| 3,367,199 A * | 2/1968 | Dankowski | F16H 55/42 474/168 |
| 3,561,829 A * | 2/1971 | Heldt | F16C 19/28 384/557 |
| 3,844,010 A * | 10/1974 | Frost | F16C 33/80 228/110.1 |
| 3,926,485 A * | 12/1975 | Frost | F16C 35/077 384/510 |
| 4,254,541 A * | 3/1981 | St. John | B23P 11/00 192/107 T |
| 4,265,133 A * | 5/1981 | Van Der Meulen | F16H 15/10 474/171 |
| 4,364,736 A * | 12/1982 | Hetz | F16H 55/42 474/168 |
| 4,402,678 A * | 9/1983 | St. John | B23P 11/00 474/171 |
| 4,443,210 A * | 4/1984 | Olschewski | F16H 7/1281 474/112 |
| 4,518,372 A * | 5/1985 | Dye | F16C 13/006 474/199 |
| 4,747,810 A * | 5/1988 | Shepley | F16C 13/006 384/192 |
| 4,838,841 A * | 6/1989 | Harvey | F16C 19/54 384/571 |
| 5,897,214 A * | 4/1999 | Nisley | F16C 13/022 384/537 |
| 6,227,994 B1 * | 5/2001 | Niki | F02B 67/06 474/148 |
| 6,293,885 B1 * | 9/2001 | Serkh | F16C 13/006 474/133 |
| 6,939,052 B1 * | 9/2005 | Hull | F16C 25/08 384/535 |
| 7,011,593 B2 * | 3/2006 | Schenk | F16C 13/006 384/477 |
| 7,364,522 B2 * | 4/2008 | Miyata | F16H 7/18 474/135 |
| 7,419,448 B2 * | 9/2008 | Miyata | F16H 7/12 474/118 |
| 7,478,952 B2 * | 1/2009 | Faust | F16C 27/04 384/535 |
| 7,789,567 B2 * | 9/2010 | Giesler | F16C 19/52 384/316 |
| 8,591,059 B2 * | 11/2013 | Casey | F16B 31/02 362/234 |
| 8,651,988 B2 * | 2/2014 | Kapfer | F16C 13/006 474/101 |
| 8,790,018 B2 * | 7/2014 | Leuven | B65G 39/09 384/477 |
| 9,068,590 B2 * | 6/2015 | Bussit | B62D 1/16 |
| 9,404,538 B2 * | 8/2016 | Kruhoffer | F16C 19/26 |
| 9,949,604 B2 * | 4/2018 | Quinn | A47L 9/0444 |
| 2006/0142102 A1 | 6/2006 | Radocaj | |
| 2008/0287236 A1 | 11/2008 | Yamaguchi et al. | |
| 2011/0147332 A1 * | 6/2011 | Breyer | B65G 9/002 212/346 |
| 2012/0065011 A1 | 3/2012 | Kvasnicka et al. | |
| 2013/0331215 A1 | 12/2013 | Hewitt | |
| 2017/0020350 A1 * | 1/2017 | Quinn | A47L 5/30 |

* cited by examiner

TWO-PIECE MOLDED PULLEY HAVING RADIAL BEARING DISTORTION-REDUCING CHARACTERISTICS

TECHNICAL FIELD

The disclosed inventive concept relates generally to pulley systems for vehicle engines. More particularly, the disclosed inventive concept relates to a two-piece pulley that is molded without the bearing in place thus eliminating an over-molding step. According to the disclosed design and method of manufacture, radial bearing distortion is reduced or eliminated.

BACKGROUND OF THE INVENTION

The modern internal combustion engine usually incorporates a pulley drive system for powering accessories driven by the engine crankshaft. The accessories typically include an air conditioning compressor, a power steering pump, a water pump, and an alternator. A front end accessory drive belt is trained around pulleys to supply power from the crankshaft of the engine to the accessories. The drive belt makes frictional contact with the face of the pulleys. The drive belt is most often a flexible reinforced polymeric belt.

Each of the accessories requires a driven pulley. In addition, operating a number of accessories, particularly with a serpentine drive belt, requires that the belt be handled carefully to allow placement of the belt in the locations needed to drive the accessories without slippage. Precise location of the belt frequently calls for the use of one or more idler pulleys.

Pulleys, such as idler pulleys, include a ball bearing (or other cartridge-type bearing) that is attached to the pulley either by press-fitting of the ball bearing into a pocket or by over-molding the ball bearing for retention. While common approaches, both of these operations may result in a distortion of the outer race of the ball bearing which may lead to irregular internal radial clearance of the bearing itself. Such distortion of the outer race is known to be a contributor to undesirable NVH issues while also reducing bearing durability.

Another undesirable result of the assembly process is that the average radial internal clearance of the bearing is changed during press fit or over-molding operations. As a consequence, the resulting radial internal clearance tolerance of the bearing cannot be controlled tightly after press fitting or over-molding.

As in so many areas of vehicle technology there is always room for improvements related to the design of a pulley for use in an internal combustion engine. Particularly, it would be advantageous to tightly control the radial internal clearance of the bearing so that bearing durability can be maximized and negative NVH effects minimized.

SUMMARY OF THE INVENTION

The disclosed inventive concept overcomes the problems of known pulley designs by providing a two piece pulley design in which the pulley main housing and the outer pulley shell are molded without the bearing in place, thus eliminating an over-molding process. The pulley main housing is molded with a slip fit pocket for the bearing. A bearing assembly is slip-fitted into the slip fit pocket. At least one of the bearing races of the bearing assembly includes an axially-protruding raised surface. The raised surface may be knurled or may be of some other configuration, such as bumps. Each of the pulley main housing and the outer shell includes a bearing shield.

On assembly, the bearing is slipped into the pocket on the pulley main housing and the outer shell is then ultrasonically welded to the main housing, thereby compressing the pulley material axially into the raised surface of the bearing race, locking the outer race of the bearing to the pulley in an axial direction.

By molding the two housing halves without the bearing in place, over-molding is rendered unnecessary and thus radial compression and distortion of the outer race are eliminated. The raised surface on the bearing race allows the bearing assembly to grip the pulley in an axial direction.

The assembly process of the disclosed inventive concept avoids subjecting the bearing assembly itself to the sort of high temperatures that ordinarily accompany the over-molding process. In addition, axial retention of the ball bearing assembly in the pulley rather than radial retention results in a minimal effect on the roundness of the ball bearing outer race or bearing radial internal clearance. This design also provides a continuous (one piece) belt running surface unlike other two-piece pulley designs which split the running surface between the two pieces of the pulley. Furthermore, the disclosed inventive concept provides a molded pulley that utilizes the two halves of the pulley, for radial structure, thus eliminating the need for internal webbing that is known to contribute to belt/pulley running surface NVH interactions.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
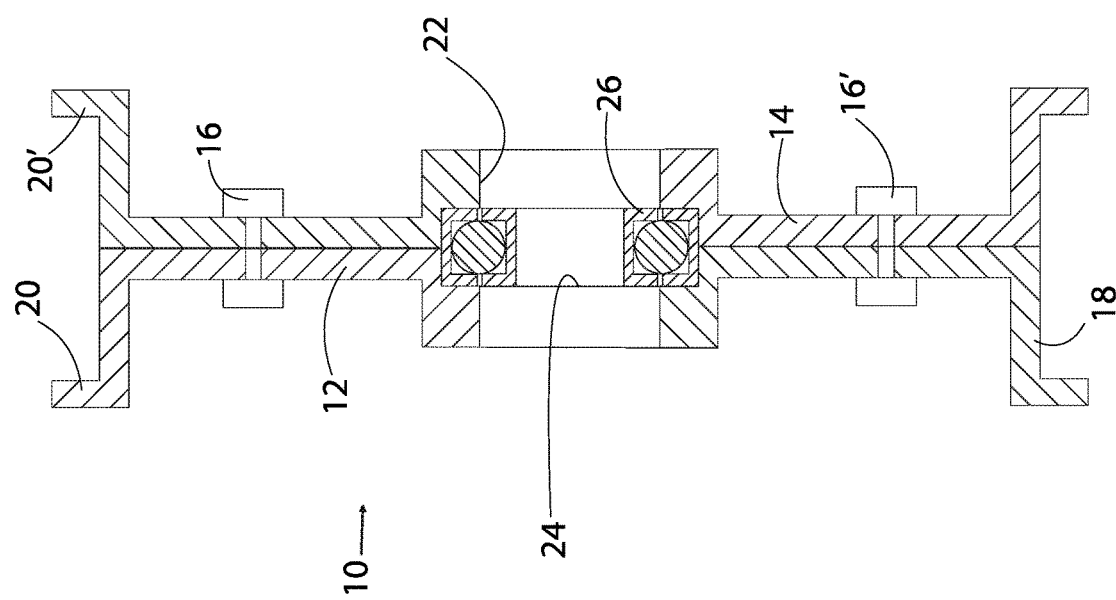
FIG. 1 is a sectional view of pulley according to existing technology.

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a two-piece pulley design that includes a main pulley housing, a slip pocket for a bearing assembly, and an outer pulley shell. The main pulley housing is ultrasonically welded to the outer pulley shell. This arrangement differs significantly from known pulleys in which press-fitting or over-molding frequently results in distortion of the outer race of the ball bearing, resulting in irregular internal radial clearance of the bearing which, as noted above, contributes to NVH issues and reduces overall bearing durability.

The arrangement of the disclosed inventive concept eliminates radial compression and distortion of the outer race of the bearing assembly. In addition, the design of the disclosed inventive concept provides a continuous (one piece) belt running surface unlike other two-piece pulley designs which split the running surface between the two pieces of a conventional pulley. Accordingly, the design as illustrated and discussed overcomes the problems typically associated with known pulley configurations.

A pulley according to the prior art is illustrated in FIG. 1. As shown and understood, the assembly of parts according to known pulley designs either by press-fitting or over-molding frequently results in distortion of the outer race of the ball bearing, resulting in irregular internal radial clearance of the bearing which, as noted above, contributes to NVH issues and reduces overall bearing durability.

Referring to FIG. 1, a sectional view of pulley according to existing technology is illustrated. The pulley, generally illustrated as 10, includes a first half 12 and a second half 14. The halves 12 and 14 are conventionally attached by, for example, fasteners 16 and 16'. With the two halves 12 and 14 attached to one another, a pulley surface 18 is defined between a peripheral wall 20 formed on the first half 12 and a peripheral wall 20' formed on the second half 14. A central bore 22 is formed through the assembled halves 12 and 14 and a bearing pocket 24 is formed there between. A bearing 26 is fitted, typically by press-fitting, within the bearing pocket 24.

The disclosed inventive concept provides a desirable alternative to the arrangement shown in FIG. 1 and described in relation thereto. Particularly, the design of the disclosed inventive concept provides a pulley in which radial compression and distortion of the outer race of the bearing assembly have been eliminated. The disclosed inventive concept is shown in FIGS. 2 through 6 and is described hereafter.

The disclosed inventive concept provides a desirable alternative to the arrangement shown in FIG. 1 and described in relation thereto.

Figure 2:
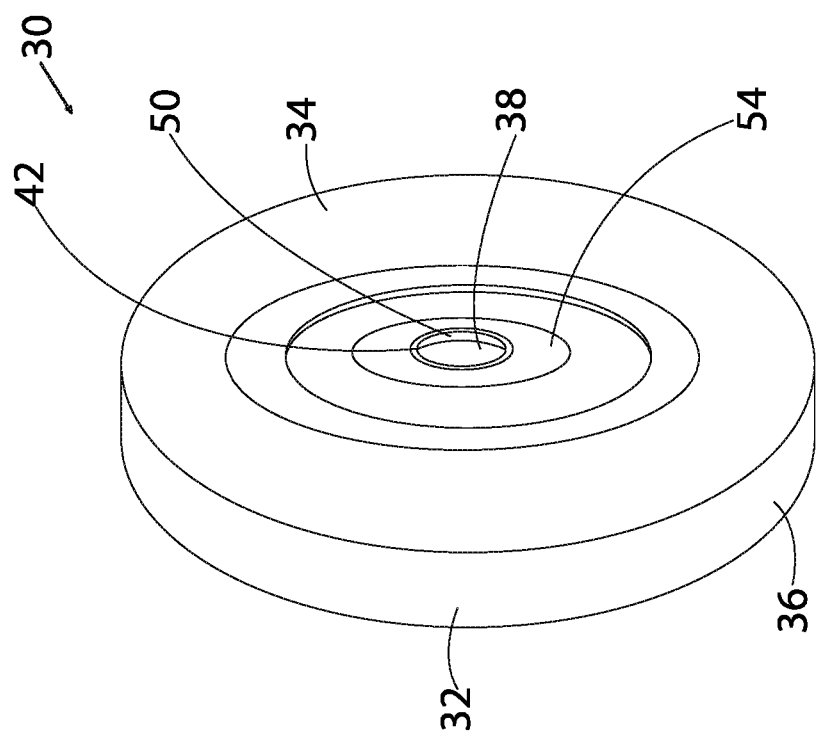
FIG. 2 is a perspective view of a two-piece pulley according to the disclosed inventive concept.
Figure 3:
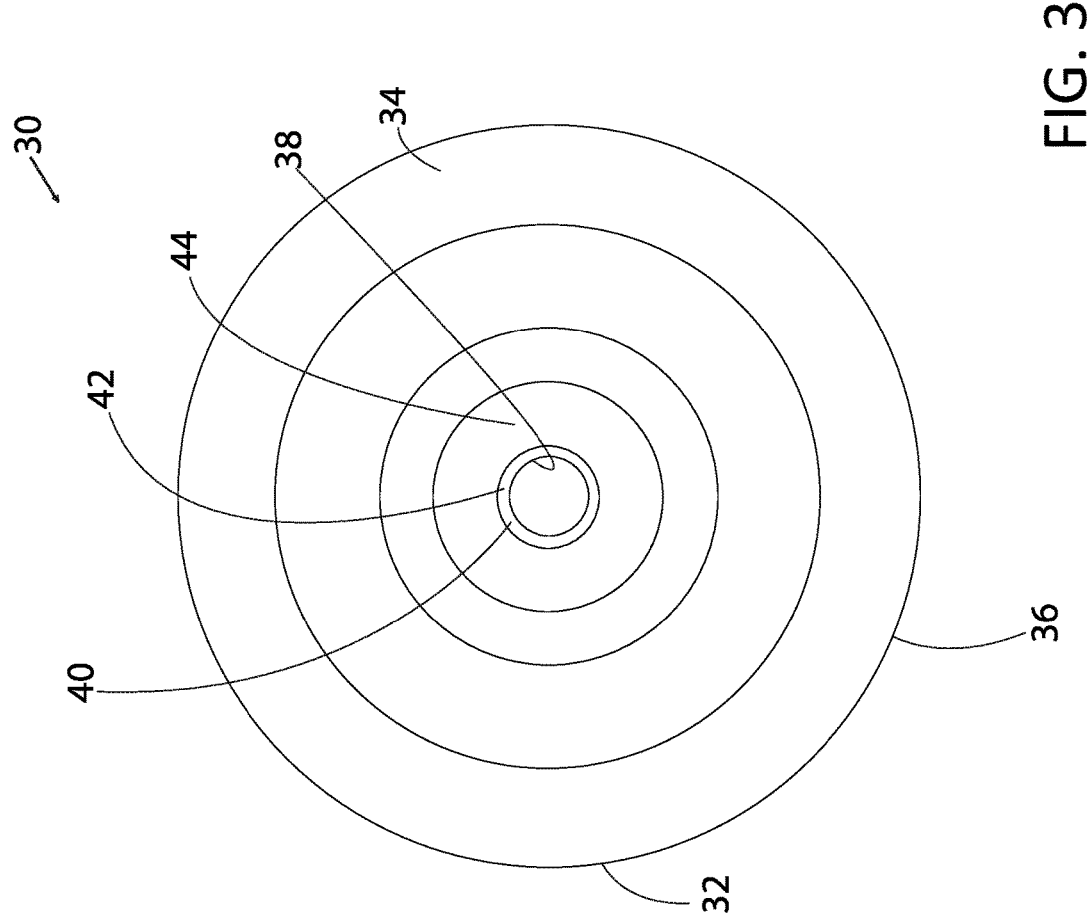
FIG. 3 illustrates a front view of the two-piece pulley according to the disclosed inventive embodiment.

Referring to FIG. 2, a perspective view of a two-piece pulley according to the disclosed inventive concept, generally illustrated as 30, is shown. In FIG. 3, a side view of the two-piece pulley 30 is illustrated.

The two-piece pulley 30 includes a pulley main housing 32 and an outer pulley shell 34. The pulley main housing 32 and the outer pulley shell 34 are attached to form the housing for the two-piece pulley 30 that includes a belt running surface 36 that extends perpendicularly from the pulley main housing 32. The belt running surface 36 is integrally formed with the pulley main housing 32. It is to be understood that the particular shape and size of the pulley 30 as shown in the figures is only suggestive and is not intended to be limiting. For example, the width of the pulley 30 as well as its diameter could be varied. The pulley main housing 32 and the outer pulley shell 34 are molded without a bearing in place, thus eliminating an over-molding process. While the pulley main housing 32 and the outer pulley shell 34 are preferably composed of a polymerized material, one or both of these components could also be made from a metal, such as steel or aluminum.

A central bore 38 is formed through the pulley main housing 32 and the outer pulley shell 34. A bearing assembly 40 is centrally provided in the central bore 38. The bearing assembly 40 includes both an inner race 42 and an outer race discussed below. An inner bearing shield 44 is provided, preferably formed as part of the pulley main housing 32. An outer bearing shield is also provided, preferably formed as part of the outer pulley shell 34, as is also discussed below. The side view of the pulley 30 illustrated in FIG. 3 is of the outer pulley shell side 34.

Figure 4:
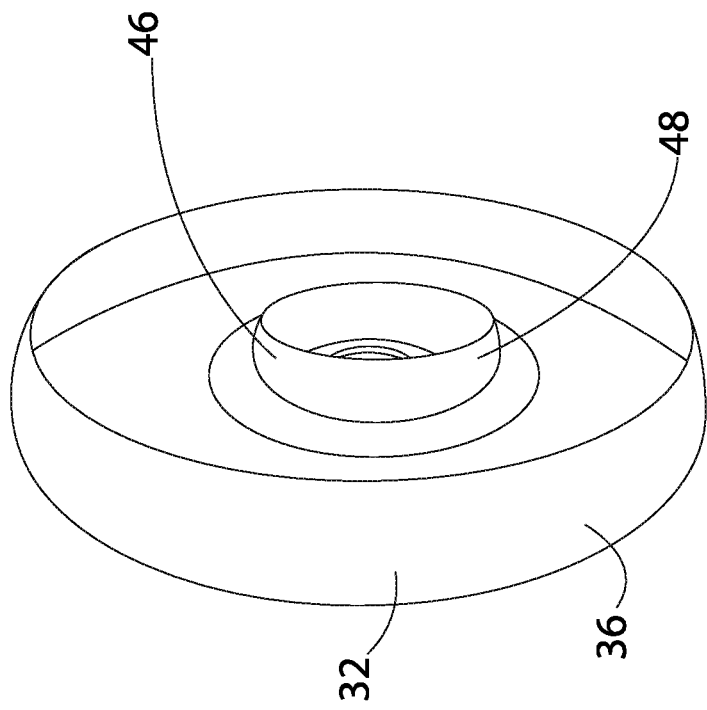
FIG. 4 illustrates a perspective view of the main pulley housing according to the disclosed inventive concept.
Figure 5:
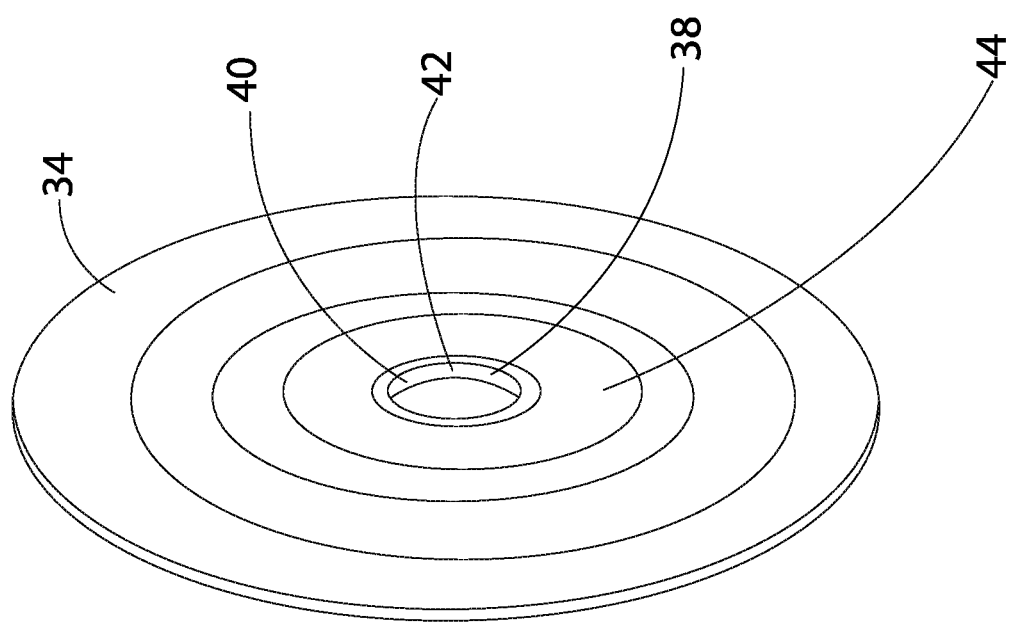
FIG. 5 illustrates a perspective view of the outer pulley shell according to the disclosed inventive concept.

Referring to FIG. 4, a perspective view of the pulley main housing 32 is illustrated in isolation. Centrally formed in the pulley main housing 32 is a slip fit bearing pocket 46 that is defined by a peripheral bearing wall 48. As is understood, the shape of the slip fit bearing pocket 46 may be varied as needed to accommodate a variety of types and sizes of bearings. Slip fit bearing pocket 46 is molded as part of the pulley main housing 32, thus eliminating radial compression and distortion of the outer race. FIG. 5 illustrates a perspective view of the outer pulley shell 34 in isolation.

Figure 6:
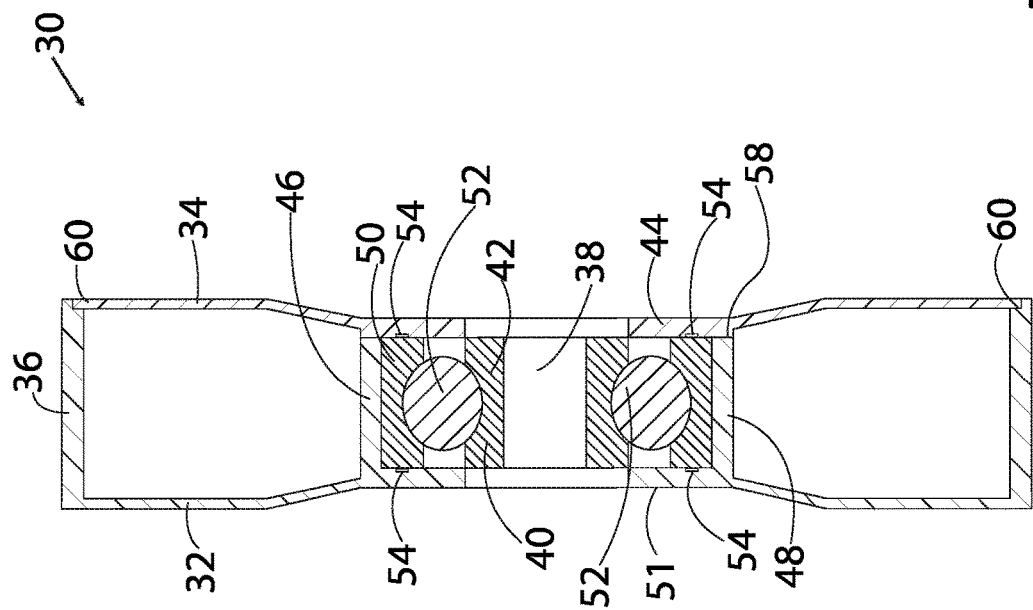
FIG. 6 illustrates a sectional view of the two-piece pulley according to the disclosed inventive concept.

Referring to FIG. 6, a sectional view of the pulley 30 is illustrated. The sectional view of the pulley 30 illustrates the pulley main housing 32, the outer pulley shell 34, the belt running surface 36, the central bore 38, and the bearing assembly 40 positioned within the bearing slip pocket 46. The bearing assembly 40 includes an outer race 50 in addition to the inner race 42. Captured between the inner race 42 and the outer race 50 is a plurality of bearings 52 retained by any of known methods, including by a bearing cage. The inner bearing shield 44, formed as part of the pulley main housing 32, and an outer bearing shield 51, formed as part of the outer pulley shell 34, prevent dirt and other debris from entering the bearing assembly 40. By incorporating the inner bearing shield 44 into the pulley main housing 32 and by incorporating the outer bearing shield 51 into the outer pulley shell 34, the need for additional bearing shields is thus eliminated.

The illustrated bearing assembly 40 is of the radial ball bearing type, but it is to be understood that other bearing types, including but not limited to other ball bearing types, including angular contact and deep groove ball bearings and may further include without limitation roller bearing types, such as spherical, thrust, needle and tapered roller bearings. Thus the disclosed inventive concept may be readily adapted for use in virtually any application where a pulley is needed.

At least one of the side walls of the bearing races, preferably the side walls of the outer race 50, includes a raised surface 54 defined as, for example, a knurled surface or as raised bumps that protrude axially around one or both of the sides of the bearing race. The raised surfaces 54 is provided to axially grip the pulley main housing 32 and the outer pulley shell 34.

To assemble the pulley 30 of the disclosed inventive concept, the bearing assembly is slipped into the bearing slip pocket 46 of the pulley main housing 32. The outer pulley shell 34 is thereafter positioned over the pulley main housing 32 and is attached thereto by, preferably but not exclusively, ultrasonic welding, thereby compressing the pulley material axially into the raised surfaces 54 of the outer race 50, thus locking the outer race 50 of the bearing assembly 40 to the pulley axially. Preferably but not exclusively, the outer pulley shell 34 is welded to the pulley main housing at slip pocket weld point 58 and at belt running surface weld point 60.

The pulley 30 of the disclosed inventive concept provides several advantages over known pulley constructions. For example, the pulley 30 is a molded pulley that does not require a bearing over-molding process that subjects the bearing to high temperatures. Axial retention of the ball bearing assembly 40 in the pulley 30 rather than radial retention results in a minimal effect on the roundness of the ball bearing outer race 50 or bearing radial internal clearance. This design of the pulley 30 as set forth herein also allows for a continuous (one piece) belt running surface unlike other two piece pulley designs that split the belt running surface between the two pieces of the pulley. Furthermore, the disclosed inventive concept provides a molded pulley 30 that utilizes the two halves of the pulley 30, outer pulley shell 34 and the pulley main housing 32, for radial structure, thus eliminating the need for internal webbing that is known to contribute to belt/pulley running surface NVH interactions.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. A pulley for use with a pulley belt, the pulley comprising:
    a pulley main housing including a central axis, a pulley face having a periphery, a belt running surface extending perpendicularly from said periphery, and a bearing pocket formed in said face coaxial with said axis;
    a bearing disposed within said pocket, said bearing including an inner race having a side wall and an outer race having a side wall, at least one of said inner race and said outer race having a raised surface formed on said side wall, said raised surface being selected from the group consisting of knurling and raised dots; and
    an outer pulley shell attached to said pulley main housing, whereby said bearing is axially constrained between said housing and said shell.

2. The pulley for use with a pulley belt of claim 1, wherein said pulley main housing and said outer pulley shell are formed from a material selected from the group consisting of a molded polymerized material and a metal.

3. The pulley for use with a pulley belt of claim 2, wherein said pulley main housing and said outer pulley shell are attached by ultrasonic welding.

4. The pulley for use with a pulley belt of claim 1, wherein each of said pulley main housing and said outer pulley shell includes a bearing shield that is positioned adjacent said bearing when assembled.

5. A pulley for use with a pulley belt, the pulley comprising:
    a pulley main housing including a central axis, a pulley face having a periphery, a belt running surface extending perpendicularly from said periphery, and a bearing pocket formed in said face coaxial with said axis;
    a bearing disposed within said pocket, said bearing having a side wall having at least one axially raised surface, said at least one axially raised surface being selected from the group consisting of knurling and raised dots; and
    an outer pulley shell attached to said pulley main housing.

6. The pulley for use with a pulley belt of claim 5, wherein said bearing is axially constrained between said housing and said shell.

7. The pulley for use with a pulley belt of claim 6, wherein said pulley main housing and said outer pulley shell are formed from a material selected from the group consisting of a molded polymerized material and a metal.

8. The pulley for use with a pulley belt of claim 7, wherein said pulley main housing and said outer pulley shell are attached by ultrasonic welding.

9. The pulley for use with a pulley belt of claim 5, wherein said bearing includes an inner race having a side wall and an outer race having a side wall.

10. The pulley for use with a pulley belt of claim 9, wherein said at least one axially raised surface is formed on at least one of said side wall of said inner race and said side wall of said outer race.

11. The pulley for use with a pulley belt of claim 5, wherein each of said pulley main housing and said outer pulley shell includes a bearing shield that is positioned adjacent said bearing when assembled.

* * * * *